UNITED STATES PATENT OFFICE.

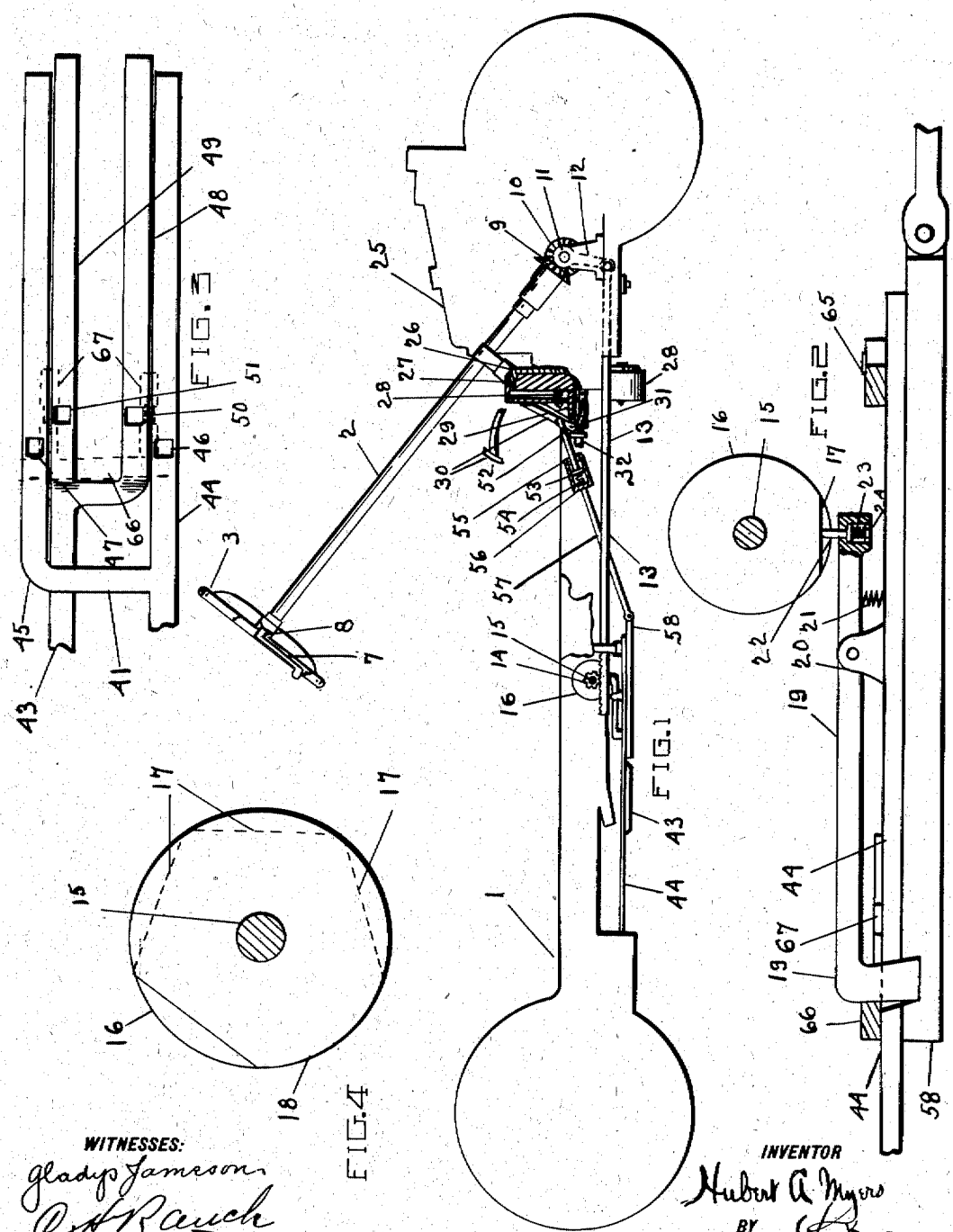

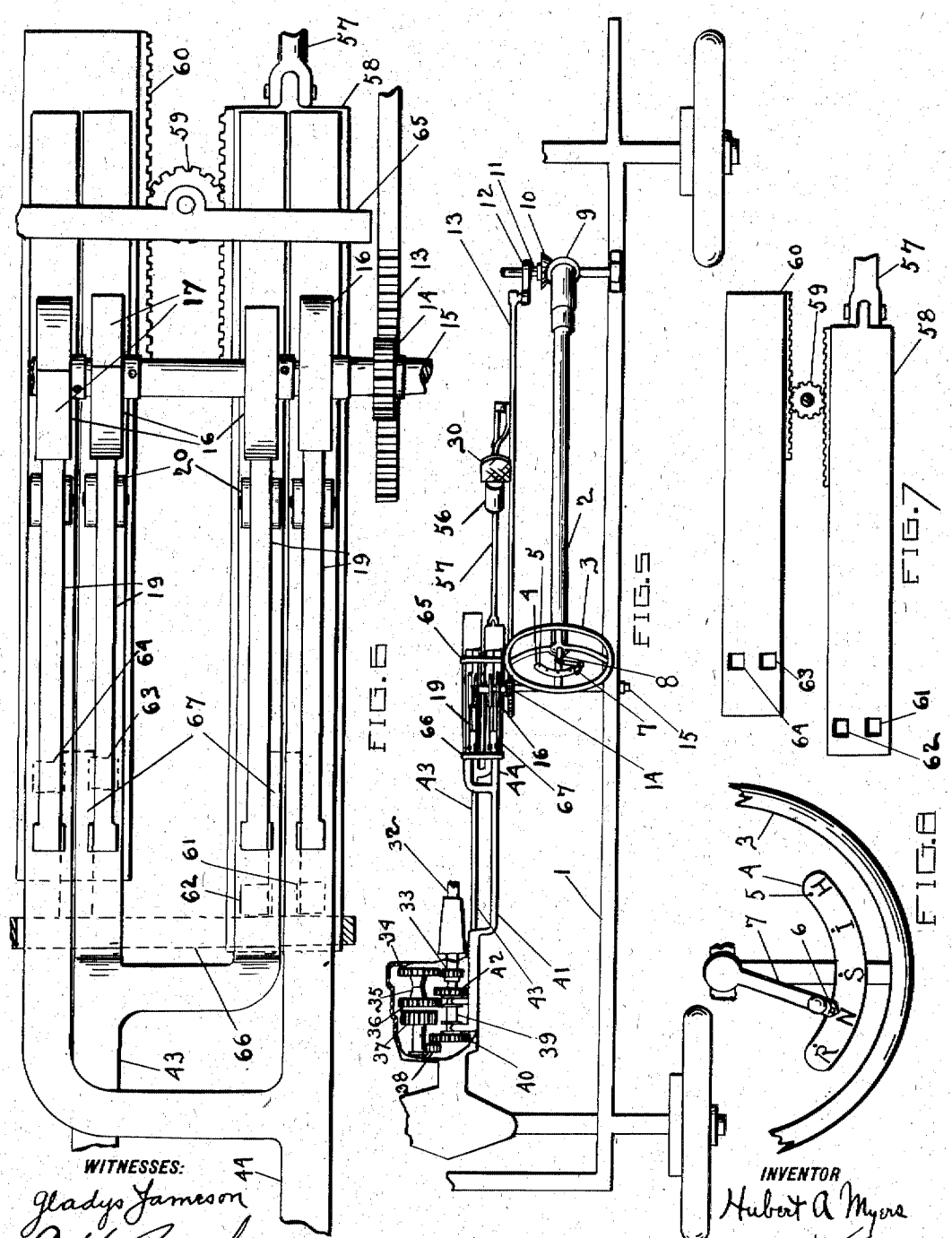

HUBERT A. MYERS, OF TOLEDO, OHIO, ASSIGNOR OF ONE-HALF TO ALBERT A. ATWOOD, OF TOLEDO, OHIO.

CONTROL MECHANISM.

1,236,593.  Specification of Letters Patent.  Patented Aug. 14, 1917.

Application filed August 13, 1913. Serial No. 784,527.

*To all whom it may concern:*

Be it known that I, HUBERT A. MYERS, a citizen of the United States, residing at Toledo, Lucas county, Ohio, have invented new and useful Control Mechanisms, of which the following is a specification.

This invention relates to simplified positive control mechanisms.

This invention has utility when embodied in speed and direction control of machines, especially applicable in connection with mechanical propulsion, as with motor vehicles.

Referring to the drawings:

Figure 1 is a fragmentary side elevation of an embodiment of the invention in connection with a motor vehicle;

Fig. 2 is a fragmentary side elevation on an enlarged scale of the selector in connecting position between the shift mechanism and the actuator therefor;

Fig. 3 is a fragmentary plan view of the pair of shift members;

Fig. 4 is a side elevation of a selector cam, showing the relative positions of the several cams thereto;

Fig. 5 is a fragmentary plan view of the device of Fig. 1;

Fig. 6 is a plan view of the mechanism of Fig. 2;

Fig. 7 is a plan view of the actuating elements of Fig. 2; and

Fig. 8 is a fragmentary plan view of the steering wheel with the selector connected thereto.

The motor vehicle 1 is provided with the steering post 2 having the steering wheel 3 mounted thereon. Carried in the steering wheel 3 is the indicator 4 having notations which in this instance may signify reverse, neutral, slow, intermediate and high speeds, identified by initials R, N, S, I, H. Adjacent the notations 4 are position fixing seats 5 into which the pin 6 of the yielding arm 7 may snap to hold the arm 7 in adjusted position and thereby insure the selected rotation by the arm 7 of the rod 8. This rod 8 through the steering post 2 has the bevel gear 9 in mesh with the bevel gear 10 on the shaft 11 carrying the arm 12 serving to reciprocate the rack bar 13 in mesh with the pinion 14 on the shaft 15 having thereon the several cams 16.

These cams 16 have irregular portions 17 disposed out of alined relation as shown in Figs. 4, 6. It is to be noted there is a position for the set of cams 16 where no irregularity 17 occurs. This position 18, Fig. 4, determines the neutral selector position of the selector, as at this set position down the cams 16 hold all of the dogs 19 out of connecting position.

For each cam 16, there is a dog 19, pivotally mounted in brackets 20 and actuated by the compression spring 21 to hold the pin 22 against the cam 16. The pin 22 is yieldably mounted in the dog 19 by the spring 23 held in position by the plug 24.

The motor 25 is provided with the fly wheel 26 opposing which is the clutch 27 held normally in driven engagement from said fly wheel by the springs 28. The clutch member 27 has the extension 29 to which is pivotally connected the foot clutch lever 30 having the fulcrum pivot 31. With the clutch in normal connecting position, the shaft 32 is the driving member having the pinion 33 (Fig. 5) thereon. The pinion 33 is in mesh with the gear 34 on the countershaft 35 which carries the intermediate speed gear 36, the slow speed gear 37, and is in driving relation with the intermediate reverse pinion 38. The driven member or shaft 39 has thereon the gear 40 which may be shifted by the shift member 41 into driven engagement from the reverse pinion 38 or slow forward actuation from the gear 37. The gear 42 on the shaft 39 may be moved by the shift member 43 to be in mesh with the intermediate speed gear 36, while the opposite shift of the member 43 directly connects the shaft 39 to be driven from the shaft 32.

The shift member 41 has extensions 44, 45, provided with seats 46, 47, respectively effecting reverse and slow speed driving connection of the mechanism just described for establishing a plurality of driving relations between the driving member 32 and the driven member 39. The change speed mechanism is but a type, it being contemplated by the invention herein to effect selection and throwing into selected driving relation of control mechanisms.

The shift member 43 has extensions 48, 49, provided with seats 50, 51, respectively effecting intermediate and high forward driving connection of the mechanism (Figs. 3, 5).

To effect actuation of the shift members, actuating means is herein shown connected to the foot lever 30. Pivotally connected to the foot lever 30 is the link element 52 having the head 53, normally held by the spring 54 against the head 55 in the relatively telescopic drum 56 of the second link element 57, thereby forming an extensible link which may be adjusted to permit the clutch 27 to be disconnected before effecting actuation of the element 58 in one direction and simultaneously similarly oppositely moving by means of the intermediate pinion 59, the member 60. These elements 58, 60 have seats 61, 62, 63, 64, respectively movable into registering relation with the seats or openings 46, 50, 51, 47, of the shift members 41, 43. Guides 65, 66 hold the shift members and actuating elements in sliding contact for their reciprocations. Stationary retaining keeps 67 are connected to the guide 66. These keeps 67 provide a shoulder overlapping the club head of the dogs 19, at all positions of the dog travels in their pivotal mounting on the shift member extensions 44, 48, 49, 45, except when the dogs have their yielding pins 22 directly below the cam shaft 15. Accordingly when the actuating elements 58, 60, bring the shift members up to this neutral position, the cams 16 which have their regular sides down may withdraw the dogs from connecting engagement between the actuator elements and the shift members. The throwing of the clutch lever forward first brings the actuator elements to neutral position and with the actuator elements in this travel to disconnecting position is positively drawn such shift member as may have been shifted to some driving relation. The parts are thus in disconnected relation and ready for selected driving connection at the recover actuation of the clutch lever by the dog connecting the selected actuator and shift member for mechanism control.

In operation, the driver of the car may make any selection within the range of the selector provided. This manual operation may occur at any time, and may be even a precaution selection, say for slow speed when normally traveling on high, or for high speed when traveling on intermediate. In the latter instance, when a steep rise is reached, mere thrusting of the clutch foot lever, provides a manual actuation independent of the selection effecting the elected speed change. The setting of the selector is accomplished by moving the arm 7 to the indicated change desired as shown by the indicator 4. This movement of the arm 7, rotates the cam shaft 15 to aline the cams 16 for neutral, if the shift is to mean no connection, or to aline the cams, say so that the shift shall be to reverse, then the cam adjacent the pinion 14 is set as shown in Fig. 2 and moves the shift members apart as shown in Fig. 3 for the dog 19 has dropped past the keep 67 through the seat 46 into the seat 61 and the actuator element 58 and the shift member 41 are connected. After this shifting action by thrusting of the foot lever, and the recover thereof by the action of the clutch springs 28 to bring about the selected driving connection of the mechanism, at any time the selector may be operated for any other speed change and thereafter such selector setting may be acted upon by an independent operation.

The mechanism is simple in its structure for general application to a plurality of shift members or adaptation to a plurality of speed change relations. There is no necessity for a driver of an automobile to become confounded by a multiplicity of control devices in remote relations or which may require complex manipulation. Herein the actuation is simple along usual lines for definite reliable use in any emergency as well as in usual practice.

What is claimed and it is desired to secure by Letters Patent is:

1. A driving member, a driven member, mechanism embodying connections for establishing a plurality of driving relations therebetween, a selector for said connections, and manually actuated means operable independently of the position of the selector and positively bringing all of the connections of the mechanism into non-driving relation and then movable to permit the selected connection to come into position between the driven member and the driving member, said means including a pair of racks and an intermediate gear.

2. A driving member, a driven member, mechanism for establishing a plurality of driving relations therebetween, a selector for different driving relations of the mechanism, and means operable independently of the position of the selector for positively bringing the mechanism to non-driving relation and then movable to permit the mechanism to effect the selected driving relation between the members, said means including a pair of racks and an intermediate gear.

3. A control member, a driving member, a driven member, mechanism for establishing a plurality of driving relations between the driving member and the driven member, a driving relation selector for the mechanism, said selector mounted on the control member, and manually actuated driving relation effecting means operable independently of the position of the selector to bring the mechanism to non-driving relation and then movable to permit a selected driving relation to the mechanism to connect for driving the driven member from the driving member, said means including a pair of racks and an intermediate gear.

4. A driving member, a driven member, mechanism for establishing a plurality of driving relations between the members, a driving relation selector for the mechanism, a clutch lever for the driving member, a motor, a clutch actuated by said lever to connect the motor to the driving member, and means between the clutch lever and the mechanism affected by the selector, said means actuated by the clutch lever positively to place the mechanism in disconnecting relation and then permit movement to the selected non-driving or driving relation between the members, said means including a pair of racks and an intermediate gear.

5. A driving member, a driven member, and driving relation determining mechanism therebetween including manually actuated means effecting determined driving relation, and an independently operable selector for setting said means for actuation at any time, said selector effective to control said means only after the mechanism is out of driving relation, said means including a pair of racks and an intermediate gear.

6. A driving member, a driven member, mechanism for establishing a plurality of driving relations therebetween, a selector for different driving relations of the mechanism operable at any time independently of the position of the mechanism, and means for bringing the mechanism to effect a selected driving relation between the members, said means including rack and pinion coacting connections first placing the mechanism in disconnected position.

7. A driving member, a driven member, mechanism for establishing a plurality of driving relations therebetween including a pair of shift bars branched in the direction of their travel, a selector for different driving relations of the mechanism, and means movable independently of the position of the selector for bringing the mechanism to effect a selected driving relation between the members, said means movable in one direction to effect mechanism disconnecting position, and in the opposite direction to effect the selected driving relation by coacting with a branch.

8. A driving member, a driven member, mechanism for establishing a plurality of driving relations therebetween including a pair of shift bars branched in the direction of their travel, a selector for different driving relations of the mechanism, and means operable independently of the position of the selector positively to bring the mechanism into disconnected driving relation and then permit movement to the selected driving relation between the members by coacting with a branch.

9. A driving relation determining device including means embodying a pair of simultaneously oppositely movable rack and pinion connected elements, a member to be connected for actuation by either of said elements, and a selector for determining the connection between the element and member.

10. A driving relation determining device selector embodying a plurality of cams, a dog coacting with each cam, and adjusting means for shifting the cams to position a selected element, and driving relation establishing mechanism including forked dog carrying members having their driving relation selected by said element, said mechanism having connections controlled by said element to bring the members into the selected driving relation.

11. A driving relation determining device selector embodying a rotatable cam, a pivoted dog coacting with said cam, and adjusting means for shifting the cam to control the dog, a reciprocable element having selected engagement with the dog, driving relation establishing mechanism connected to be controlled by the element, and actuating mean for the element, said means including a pair of racks and an intermediate gear.

12. A driving relation determining device selector embodying a control member, a pivoted dog coacting with said control member, and adjusting means for shifting the control member to position the dog, a reciprocable element having selected engagement with the dog, a guide for retaining the dog in engagement with the element, driving relation establishing mechanism connected to be controlled by the element, and actuating means for the element, said means including a pair of racks and an intermediate gear.

13. Mechanism for establishing a plurality of driving relations, shift members for the mechanism, a pair of rack and pinion connected simultaneously oppositely movable elements for actuating the members, and an independently operable selector for selecting a connection between one of the elements and either member.

14. Mechanism for establishing a plurality of driving relations, a shifting device for the mechanism, an independently operable selector for determining the driving relation shift of the device, actuating means for moving the device toward and from disconnecting position as to the mechanism, said device in its movement to disconnecting position as to the mechanism being disconnected from the mechanism, and means for retaining said device connected to the mechanism while the device is disconnected from the selector, said means including a pair of racks and an intermediate gear.

15. Mechanism for establishing a plurality of driving relations, a shifting device for the mechanism, an independently operable selector for determining at any time as next any driving relation shift of the device, and actuating means positively to disconnect the device from the mechanism when the mechanism is out of driving relation and then permit the selected driving relation connection, said means including a pair of racks and an intermediate gear.

16. Mechanism for establishing a plurality of driving relations embodying a pair of shift members, provided with shift position determining seats, reciprocable actuating elements for the shift members, said elements having seats movable into registry with the seats of the shift members, at disconnecting driving relation only of the mechanism, a selecting connector, and means positively bringing said element and member seats into registry to permit said connector to effect a connection for shifting of a member by an element.

17. In a device of the class described, a gear shifting device comprising oppositely movable forked shift bars and pivotally mounted members supported and controlled thereby.

18. In a device of the class described, a gear shifting device comprising oppositely movable forked shift bars, pivotally mounted members supported and controlled thereby, and an actuating lever coöperating with said members.

19. In a device of the class described, a variable speed transmission gearing having a plurality of forked shiftable members, coacting means for shifting said elements embodying pivoted members mounted on the forks of said elements, and a selector for actuating the means connection.

20. In a device of the class described, a variable speed transmission gearing having a plurality of shiftable elements forked in the direction of their reciprocation, means for shifting said elements embodying pivoted members movable with said elements, a selective finder coöperating with said pivoted members, and an indicator for coöperation with said finder.

21. In a device of the class described, a variable speed transmission gearing having a plurality of oppositely reciprocable forked elements, means for shifting said elements embodying pivoted members carried by said elements, a selective finder coöperating with said pivoted members, and an indicator for coöperation with said finder, said finder having a notch into which the selected member falls by gravity.

22. In a device of the class described, a variable speed transmission gearing having shiftable elements in forked pairs, in combination with an indicator and a selective device embodying normally elevated pivoted members, one mounted on each fork of the shiftable elements.

23. In a device of the class described, a gear actuating element, its corresponding actuating member, a finder, an indicator, and movably-mounted members elevated and controlled by said finder, one of said last named members carried by the element.

In witness whereof I affix my signature in the presence of two witnesses.

HUBERT A. MYERS.

Witnesses:
A. A. ATWOOD,
GEO. E. KIRK.

Correction in Letters Patent No. 1,236,593.

It is hereby certified that in Letters Patent No. 1,236,593, granted August 14, 1917, upon the application of Hubert A. Myers, of Toledo, Ohio, for an improvement in "Control Mechanisms," an error appears in the printed specification requiring correction as follows: Page 3, line 88, claim 11, for the word "mean" read *means;* and that the said Letters Patent should be read with this correction therein that the same may conform to the record of the case in the Patent Office.

Signed and sealed this 4th day of September, A. D., 1917.

[SEAL.]

R. F. WHITEHEAD,
*Acting Commissioner of Patents.*

Cl. 74—58.